May 10, 1938.  E. S. WHITTIER  2,117,012
INSTRUMENT SUPPORTING DEVICE
Filed May 29, 1937
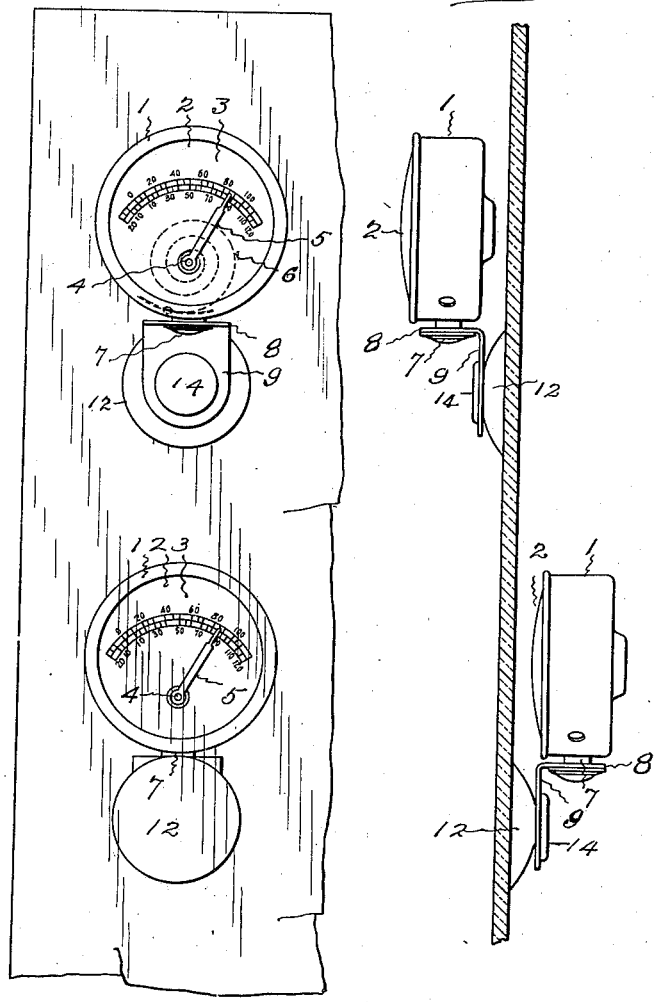
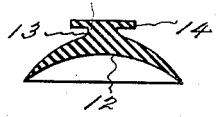
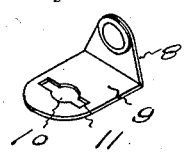
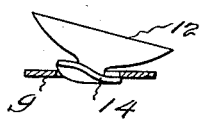
INVENTOR
Elmer S. Whittier
by
Harry P. Williams
att.

Patented May 10, 1938

2,117,012

UNITED STATES PATENT OFFICE 2,117,012

INSTRUMENT SUPPORTING DEVICE

Elmer S. Whittier, Bristol, Conn., assignor to The Cooper Oven Thermometer Company, Plymouth, Conn., a corporation of Connecticut Application May 29, 1937, Serial No. 145,494

3 Claims. (Cl. 248—206)

This invention relates to an article designed to indicate temperature which is adapted to be easily attached by anyone in such manner that it will not accidently become detached, to hard, smooth surfaces such as glass, porcelain, enamel, metal or wood without the employment of tools or marring the surface to which the article is attached.

The object of the invention is to provide a small inexpensive efficient article of the character mentioned which without change of construction may be applied to the outside of an automobile windshield or automobile window or house window, in position for the outside temperature to be observed from the inside through the window, or may be applied to the inside of a windshield or window should it be desired to be able to observe the interior temperature. The article may be attached to a mirror or to the walls of a refrigerator or oven, or other hard smooth surface and turned to an angle that allows the temperature of the enveloping atmosphere to be readily observed.

The embodiment of the invention illustrated comprises a casing containing a dial in front of which and inside of a lens turns a pointer that is actuated by a thermo-responsive metallic strip. Pivoted to the bottom of the casing is the end of an angular bracket the free end of which is perforated and supports the stem of a rubber cup-shaped suction disk. When the article is to be mounted on the outside of a transparent pane to be read from the inside, the bracket is turned so that the cup faces frontwise, and when the article is to be placed on the inside of a pane or wall the bracket is turned so that the cup faces rearwise.

In the accompanying drawing Fig. 1 shows a sheet of glass with an article which embodies the invention attached to the inside, and a similar article attached to the outside of the sheet.

Fig. 2 is a side view of what is shown in Fig. 1.

Fig. 3 is a section of the suction cup.

Fig. 4 is a perspective view of the bracket member of the device.

Fig. 5 is a view illustrating the manner of attaching the suction cup to the bracket.

The article illustrated has a cylindrical case 1 with a lens 2 closing its front end and a dial 3 inside of the lens. An arbor 4 extends through the dial and on its front end has a pointer 5 while to its rear end is fastened one end of a coil 6 of thermo-responsive metal.

Rotatably fastened to a stud 7 that is secured to the bottom of the case is the horizontal limb 8 of an angular bracket. The vertical limb 9 of the bracket has a circular perforation 10 with slots 11 extending from opposite edges.

The suction cup 12 is preferably made of yielding rubber with a concave front face and convex rear face. Extending from the back of the cup is a circular stem 13 with a flange 14. The cup is attached to the bracket by entering an edge of the flange in the slots 11 and turning it so that the flange will thread through the hole and be on one side with the cup on the other side of the vertical limb of the bracket.

With this construction the cup may be turned to the rear of the article and readily attached to the near surface of a sheet of glass or any hard smooth surface, so that the position of the pointer with respect to the dial may be conveniently observed, as illustrated at the upper part of Figs. 1, 2. Should it be desired to attach the article to the far surface of a transparent sheet the cup is turned to the front so that the readings will be seen through the sheet, as shown at the lower part of Figs. 1, 2. The article is inexpensive and one or more, side by side or one above the other, may be quickly applied by anyone in the desired location. The connection of the bracket to the casing is sufficiently tight to prevent accidental turning of the article when in place of use, and the cup is easily attached to the bracket so as to form a firm support.

The invention claimed is:

1. A support for means for indicating atmospheric conditions, comprising an annular casing adapted to enclose such indicating means, an angular bracket with a horizontal leg and a vertical leg, means extending radially of the periphery of said casing and pivotally connecting the casing to the horizontal leg of the bracket and allowing the casing to be rotated on a diametrical axis, and a single flexible suction cup secured to the vertical leg of the bracket below the periphery of said casing, whereby said cup may be attached to a vertical surface and the casing turned on a diametrical axis to face toward or to face away from said surface.

2. A support for means for indicating atmospheric conditions, comprising an annular casing adapted to enclose such indicating means, an angular bracket with a horizontal leg and a vertical leg, means extending radially of the periphery of said casing and pivotally connecting the casing to the horizontal leg of the bracket and allowing the casing to be rotated on a diametrical axis, and a single flexible suction cup rotatably secured to the vertical leg of the bracket beyond the periphery of said casing, whereby said cup may be attached to a vertical surface and the casing turned on a diametrical axis to face toward or to face away from said surface and revolved about a horizontal axis to a position above or below said cup.

3. A support for means for indicating atmospheric conditions, comprising an annular casing adapted to enclose such indicating means, a bracket, means pivotally connecting the casing to said bracket and allowing the casing to be rotated on a diametrical axis, and a flexible suction cup rotatably secured to said bracket, whereby said cup may be attached to a vertical surface and the casing turned on a vertical axis and revolved on a horizontal axis.

ELMER S. WHITTIER.